WILLIAM THOMSON.

Instrument for Measuring Powders.

No. 120,404. Patented Oct. 31, 1871.

120,404

UNITED STATES PATENT OFFICE.

WILLIAM THOMSON, OF MADISON, WISCONSIN.

IMPROVEMENT IN INSTRUMENTS FOR MEASURING POWDERS.

Specification forming part of Letters Patent No. 120,404, dated October 31, 1871.

*To all whom it may concern:*

Be it known that I, WILLIAM THOMSON, of the city of Madison, State of Wisconsin, have invented certain Improvements in Instruments for Measuring Powders, of which the following is a specification:

The object of my invention is to facilitate the operation of measuring powders, for medicinal, domestic, and other purposes, in a more convenient and more certain manner than heretofore done by aid of the present known and used measure.

Figure 1:
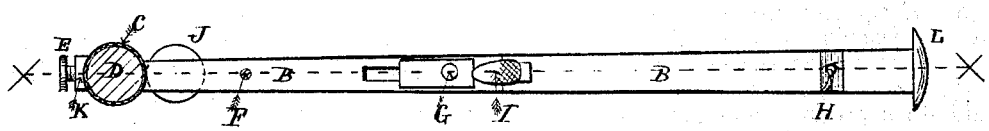
Figure 2:
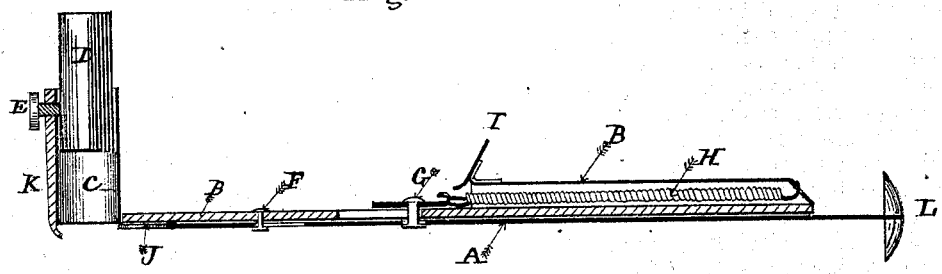

Figure 1 is a plan view of an instrument embodying my invention. Fig. II is a longitudinal cut-section of the same through the line $x$ $x$, Fig. I.

A is a stationary frame. B is a movable frame, to which is attached a receptacle or measure, C, having a movable stopper or drum, D, said stopper to be raised up or down and held in any desirable place by a set-screw, E. F and G are bolts or rivets for the purpose of holding the movable frame B in its position. H is a spiral spring, one end of which is fastened to the movable frame B, the other end to the bolt G. I is a finger-guard. On the end of the stationary frame A is a cover, J, of the same diameter or a little larger than the measure C. K is a guard to prevent the cover J from extending beyond the opening of the measure C. L is a guard or bottom for the palm of the hand to rest against.

In order to enable others conveniently to make use of my improved measure, I will state that the ingredients for medical purposes to be measured are weighed and thoroughly mixed in a mortar, which is secured in an inclined position of fifty to sixty degrees. The number of grains constituting each powder is weighed, the drum or stopper D lowered down, and the powder deposited in the receptacle or measure G; then the drum is pushed up till the measure is level full, when it is secured in place by the thumb-screw F. When in operation the instrument is held in a horizontal position, the index-finger resting on the finger-guard or trigger I, and the button or guard L (on the end of the stationary frame A) resting under the thumb, or between it and the index-finger. The frame or handle A, where it rests between the thumb and second or index-finger, is made in a square or flat form, to prevent the instrument from rolling in the hand or being displaced when in use. The measure G is immersed in the powder in a horizontal position and drawn through it in such a position half an inch or more, when the hand holding the instrument is compressed, and thus pushing up the cut-off, whereby the powder in the measure is secured, and will not be disturbed by a gentle tap of the instrument against the mortar-wall to relieve it of what may adhere to the outside. It is then carried to the place of deposit, when the hand is relaxed and the cut-off moves back. In this operation the hand is rotated only from right to left, whereas in using an ordinary measure the operation is much more severe on the wrist, as it requires to be rotated to and fro. The button or guard L at the end of the stationary frame A, and also the finger-guard I, may be covered with soft rubber or buckskin.

By enlarging the instrument larger quantities, such as a pound or more of tea, coffee, spice, rice, flour, gunpowder, &c., may be much more quickly and readily measured than by aid of the present measures.

Having thus described my invention, I desire to claim—

The stationary frame A, the movable frame B, the receptacle C, the stopper D, the set-screw E, the bolts F and G, the spiral spring H, the finger-guard I, the cover J, and the guards K and L, all substantially as and for the purpose hereinbefore set forth.

WM. THOMSON.

Witnesses:
RICHARD GERNER,
A. C. CRONDAL.

(98)